Dec. 24, 1957     P. J. J. TERCÉ     2,817,285
COFFEE-MAKER

Filed April 2, 1954     2 Sheets-Sheet 1

Inventor:
Paul Joseph Jean Tercé
By Edward F. Jurow
Atty

Inventor:
Paul Joseph Jean Tercé
By Edward F. Jurow
Atty.

United States Patent Office 2,817,285
Patented Dec. 24, 1957

2,817,285
COFFEE-MAKER

Paul Joseph Jean Tercé, Paris, France

Application April 2, 1954, Serial No. 420,687
Claims priority, application France April 30, 1953
1 Claim. (Cl. 99—303)

The present invention relates to a coffee-maker which rapidly makes a coffee of good quality. In known types of coffee-makers, the water brought to the boiling point by an external source of heat, flows through a filter containing the ground coffee or is vaporized in a closed vessel to be discharged through the filter located in another vessel or in the open.

In both cases, an appreciable quantity of water must be brought to a high temperature before it starts to flow through the filter, thus increasing the duration of the operation. Coffee-makers are known which permit infusions and decoctions to be obtained, and in which the source of heat and the filter are immersed in the water of a vessel. However no means exist, in such last mentioned apparatus, to bring about the extraction of the essence of the coffee by directing a continuous stream of hot water through the ground coffee.

The coffee-maker, according to the present invention, permits a fractional extraction of the essence of the coffee to be obtained. This coffee-maker consists of a container containing the water into which is immersed a filter containing the ground coffee and a source of heat enclosed in a central tube mounted inside a casing in which an ascending stream of water is created by convection. The invention is characterized in that the adjacent walls of the casing and the filter are provided with perforations securing a straight connection between the upper wall of the casing and the inside of the filter.

This arrangement permits the small amount of water in the casing adjacent the immersed source of heat to be rapidly brought to a sufficiently high temperature. This water is conveyed by convection through the filter and is replaced by cold water brought by the convection stream towards the heat source. The essence of coffee thus obtained diffuses rapidly in the mass of water contained in the coffee-maker, and heats it partly up to the suitable temperature, the complement of heat being brought by conduction from the source of heat.

This circulation of the hot water through the filter by convection inside the mass of the liquid offers the following advantages:

The vaporization of water is very small at the end of the heating operation so that the present coffee-maker, with a source of heat having the same power as that of other coffee-makers, prepares coffee in a shorter period than in the other coffee-makers.

The immediate diffusion in the water of the essence of the coffee, strongly heated right from the beginning of the heating, permits a coffee of improved quality.

By way of example, two preferred forms of embodiment of the invention are described hereafter and illustrated in the annexed drawing.

Figure 1:
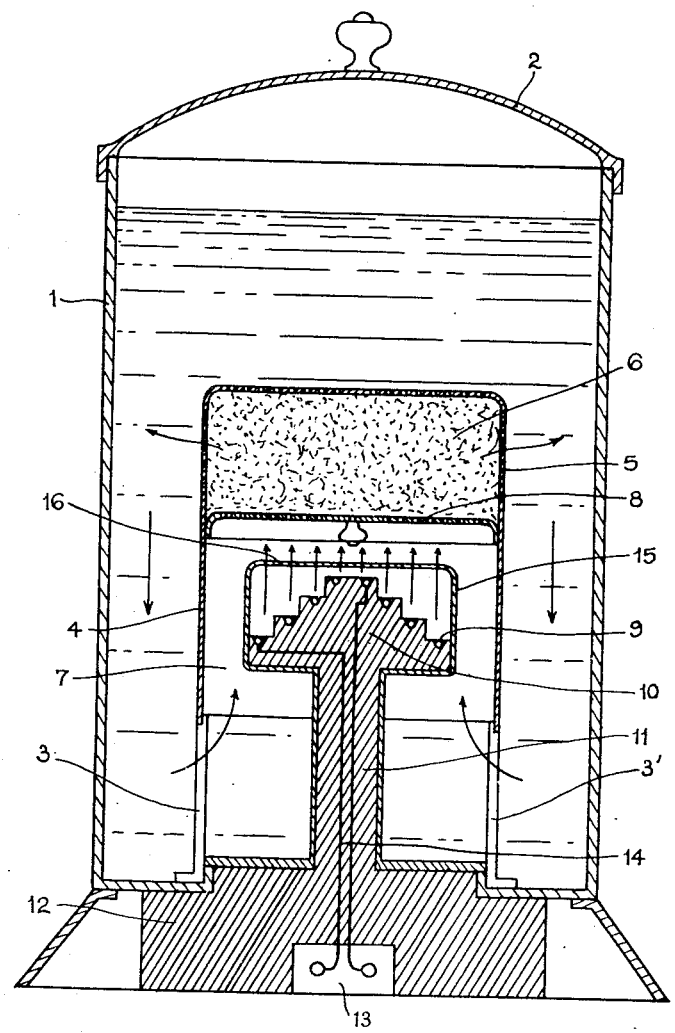
Figure 1 is a sectional elevation view of a first embodiment of a coffee-maker, according to the invention.

The coffee-maker, according to the invention illustrated in Figure 1 includes a container 1 closed by a lid 2, and in which the required amount of water is introduced. A removable cylindrical casing 4 has a perforated filter portion 5 formed at the upper end thereof to support ground coffee 6 above a removable perforated filter wall 8. The casing 4 is preferably mounted inside the container on supports 3, 3' in order to establish direct communication between the upper part of the casing and the inside of the filter. The source of heat intended to produce by convection the flow of hot water through the filter 5 is arranged in the lower open part 7 of the casing 4. The source of heat is constituted by an electric resistance 9, contained in a central tube 15. This resistance 9 is wound upon a head 10, made of an insulating material with concentric steps, supported by an insulating stand 11, mounted on an insulating pedestal 12 arranged under the container 1, and in which is fitted the receptacle plug 13 for the feed wires 14. The resistance 9 is constituted by a bare wire and the supporting head 10 is enclosed by the upper closed portion of the tube 15, which is internally blackened so as to receive and to transmit to the surrounding water the radiation of the glowing resistance 9. The water surrounding the tube 15 is thereby rapidly brought to a high temperature and an active convection stream originates in the mass of water, in the direction indicated by the arrows in the drawing. The upper wall 16 of the tube 15 transmitting the radiation of the resistance, is fitted as close as possible to the filtering wall 8 to reduce the amount of water subjected at each instant to the action of the source of heat and the area located between the tube 15 and the cylindrical wall of the surrounding casing 4 is arranged to secure a satisfactory circulation. The casing 4 extends downwardly a sufficient distance to permit the feeding of cold water for the convection stream sufficiently far from the source of heat.

Figure 2:
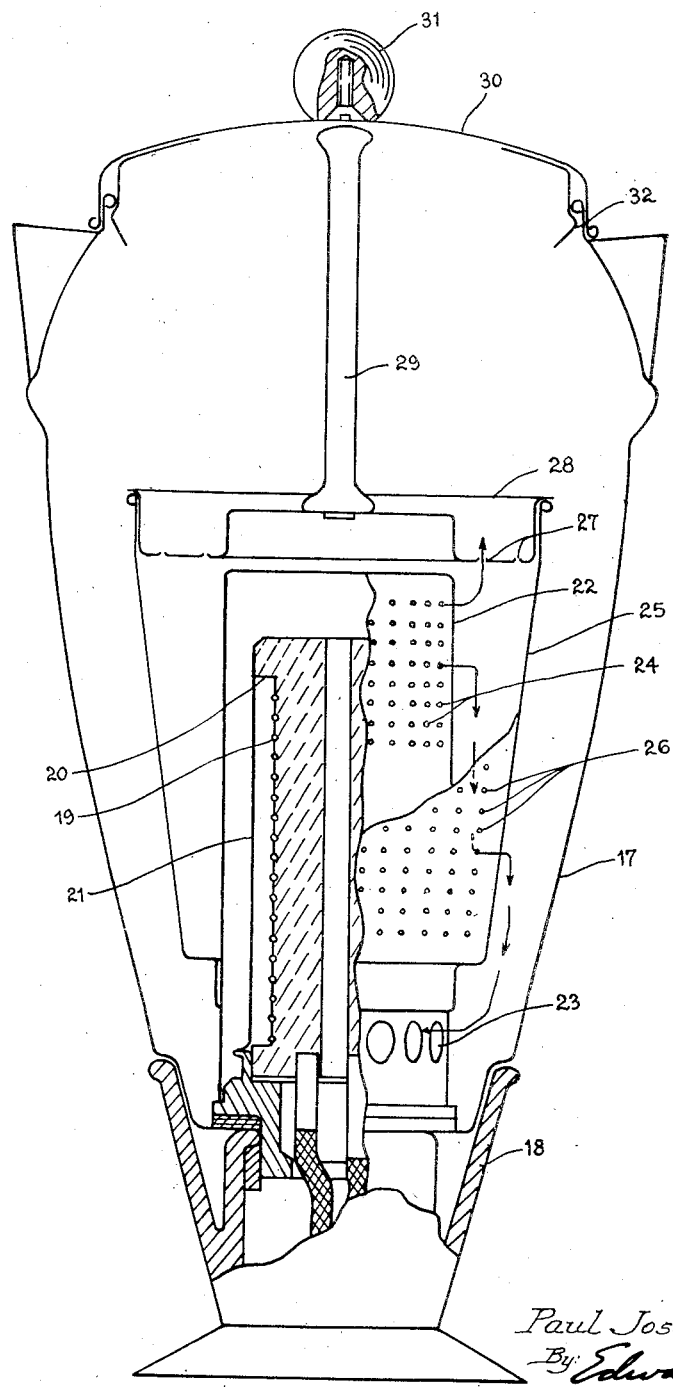
Figure 2 is a sectional elevation view, partly in section, of a second embodiment.

In the embodiment illustrated in Figure 2, the coffee-maker includes a container 17 fixed on a pedestal 28 which can be partially or completely filled with water. A bare heating resistance 19, helically wound on an insulating core 20 is contained in a central internally blackened tube 21, mounted in a cylindrical casing 22. The casing 22 is closed at its upper end and has inlet ports 23 formed therein adjacent its lower end for the water moved by convection. Relatively small perforations 24 are provided in the upper portion of the casing 22. A filter portion 25 concentrically encloses the casing 22. This filter contains the ground coffee and is provided with perforations 26 in the lower portion thereof below the perforated zone of the casing 22. A cup-shaped lid 28, preferably provided with a few perforations 27, is mounted with a slide fit in the filter portion 25.

It is obvious that with this arrangement, the adjoining perforated walls of the casing 22 and the filter 25 provide a direct communication between the upper part of the casing and the inside of the filter.

The advantage is the same as in the first embodiment, namely that the very small amount of water in the immediate vicinity of the source of heat, is rapidly brought to a sufficiently high temperature to flow by convection out through the perforations in the upper part of the casing, and is compelled to cross through the ground coffee in suspension in the water before flowing out of the filter, either from the bottom or from the top thereof.

The filter 25 preferably having the shape of a truncated cone, is made integral with the casing 22 surrounding the resistance 19 and is embodied in the pedestal of said resistance. The assembly of the casing and the filter is removable.

A stem 29 forming a handle, is fixed to the lid of the filter to permit the removal of said lid. The container 17 is closed by means of a lid 30, topped by a spherical knob 31 permitting removal of said lid. The lid 30 is internally provided, at each of its ends, with a spring 32, the lid and the spring contacting both sides of the upper part of the container.

The coffee-maker, according to the present invention, works as follows:

The container 17 is partially or completely filled with water, according to the requirements, and the filter is partially or completely filled with ground coffee. The heating resistance 19 brings to a high temperature the water surrounding the central tube 21 and an active stream of convection originates in the mass of water, in the direction shown by the arrows in the drawing, so that the stream crosses through all the ground or powdered coffee. Even if, initially, the filter is not entirely filled with coffee, the coffee floats in the filter opposite the perforations 24 of the casing 22, and thereby receives also the hot stream crossing through it at the outlet of the casing 22, before being directed towards the bottom or the top to escape from the filter through the perforations 26 or 27.

What I claim is:

In a coffee pot comprising a container adapted to be filled with water and having a cylindrical electric heating element vertically located at the bottom thereof, an annular percolating member necessarily completely arranged below the level of the water in said container, said percolating member comprising an inner tubular casing having a closed upper end and removably arranged on the bottom of the container to coaxially surround the heating element, whereby a narrow annular space is formed between the heating element and said inner casing, said inner casing being provided with openings adjacent the lower end thereof, an outer downwardly tapering frusto-conical casing having an annular bottom portion, a cylindrical collar formed in said bottom portion and tightly fitted on said inner tubular casing above said openings to form an annular space adapted to contain ground coffee, a removable lid substantially closing the upper end of said annular percolating member and spaced above the heating element, the upper part of said inner casing having a series of relatively small perforations provided in the periphery thereof, the lower part of said outer frusto-conical casing having a series of relatively small perforations provided in the periphery thereof, whereby a convection stream of hot water below boiling temperature is circulated radially through the ground coffee contained in the annular percolating member.

References Cited in the file of this patent

UNITED STATES PATENTS

| | | |
|---|---|---|
| 645,277 | Tourville | Mar. 13, 1900 |
| 952,941 | Perkins | Mar. 22, 1910 |
| 1,072,154 | Ovington | Sept. 2, 1913 |
| 1,778,926 | Weigand | Oct. 21, 1930 |
| 1,946,247 | Wales | Feb. 6, 1934 |
| 1,963,012 | Barrett | June 12, 1934 |
| 2,610,283 | Kolisch | Sept. 9, 1952 |